(12) United States Patent
Yadav et al.

(10) Patent No.: US 12,210,416 B1
(45) Date of Patent: Jan. 28, 2025

(54) EXPANDING DISCOVERY DURING BACKUP GENERATION TO GENERATE SNAPSHOT BACKUPS

(71) Applicant: Dell Products L.P., Round Rock, TX (US)

(72) Inventors: Sunil Yadav, Bangalore (IN); Shelesh Chopra, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/506,249

(22) Filed: Nov. 10, 2023

(51) Int. Cl.
*G06F 11/14* (2006.01)

(52) U.S. Cl.
CPC ...... *G06F 11/1435* (2013.01); *G06F 11/1461* (2013.01); *G06F 11/1469* (2013.01); *G06F 2201/84* (2013.01)

(58) Field of Classification Search
CPC ............. G06F 11/1451; G06F 11/1461; G06F 11/1469; G06F 11/1435; G06F 2201/84
USPC ........................................................ 711/162
See application file for complete search history.

(56) References Cited

U.S. PATENT DOCUMENTS

| | | | |
|---|---|---|---|
| 2022/0043718 A1* | 2/2022 | Sharma | G06F 11/1464 |
| 2022/0043722 A1* | 2/2022 | Yadav | G06F 11/1469 |
| 2023/0040635 A1* | 2/2023 | Narayan | G06F 16/24578 |

\* cited by examiner

*Primary Examiner* — Hashem Farrokh
(74) *Attorney, Agent, or Firm* — Chamberlain, Hrdlicka, White, Williams & Aughtry; Aly Dossa

(57) ABSTRACT

Techniques described herein relate to a method for performing generating backups of host snapshots. The method may include identifying, by a data protection agent of a host, an asset discovery event associated with the host; in response to identifying the asset discovery event: obtaining file system metadata associated with the host from a file system metadata repository on a storage of the host; identifying existing snapshots on the host using the file system metadata; obtaining snapshot metadata associated with the snapshots using the file system metadata; providing the file system metadata to a data protection manager to generate assets; and providing the snapshot metadata to the data protection manager to generate pseudo-assets.

20 Claims, 8 Drawing Sheets

US 12,210,416 B1

EXPANDING DISCOVERY DURING BACKUP GENERATION TO GENERATE SNAPSHOT BACKUPS

BACKGROUND

Computing devices may provide services for users. To provide the services, the computing devices may generate data. The computing devices may provide and obtain data from other computing devices. The data may be important to the user. Data protection services may be performed to protect the data. The data protection services may include generating backups of data on one computing device and storing the backup on another computing device. The backup may include previously generated copies of the data. A user may desire to backup the previously generated copies of data.

SUMMARY

In general, certain embodiments described herein relate to a method for generating backups of host data snapshots. The method may include identifying, by a data protection agent of a host, an asset discovery event associated with the host; in response to identifying the asset discovery event: obtaining file system metadata associated with the host from a file system metadata repository on a storage of the host; identifying existing snapshots on the host using the file system metadata; obtaining snapshot metadata associated with the snapshots using the file system metadata; providing the file system metadata to a data protection manager to generate assets; providing the snapshot metadata to the data protection manager to generate pseudo-assets, wherein generating pseudo-assets by the data protection manager comprises: generating pseudo-assets based on the snapshot metadata, wherein the pseudo-assets correspond to the snapshots; assigning the pseudo-assets to protection policies; and performing data protection services on the pseudo-assets based on the protection policies.

In general, certain embodiments described herein relate to a method for generating backups of host data snapshots. The method may include identifying, by a data protection agent of a host, an asset discovery event associated with the host; in response to identifying the asset discovery event: obtaining file system metadata associated with the host from a file system metadata repository on a storage of the host; identifying existing snapshots on the host using the file system metadata; obtaining snapshot metadata associated with the snapshots using the file system metadata; providing the file system metadata to a data protection manager to generate assets; and providing the snapshot metadata to the data protection manager to generate pseudo-assets.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
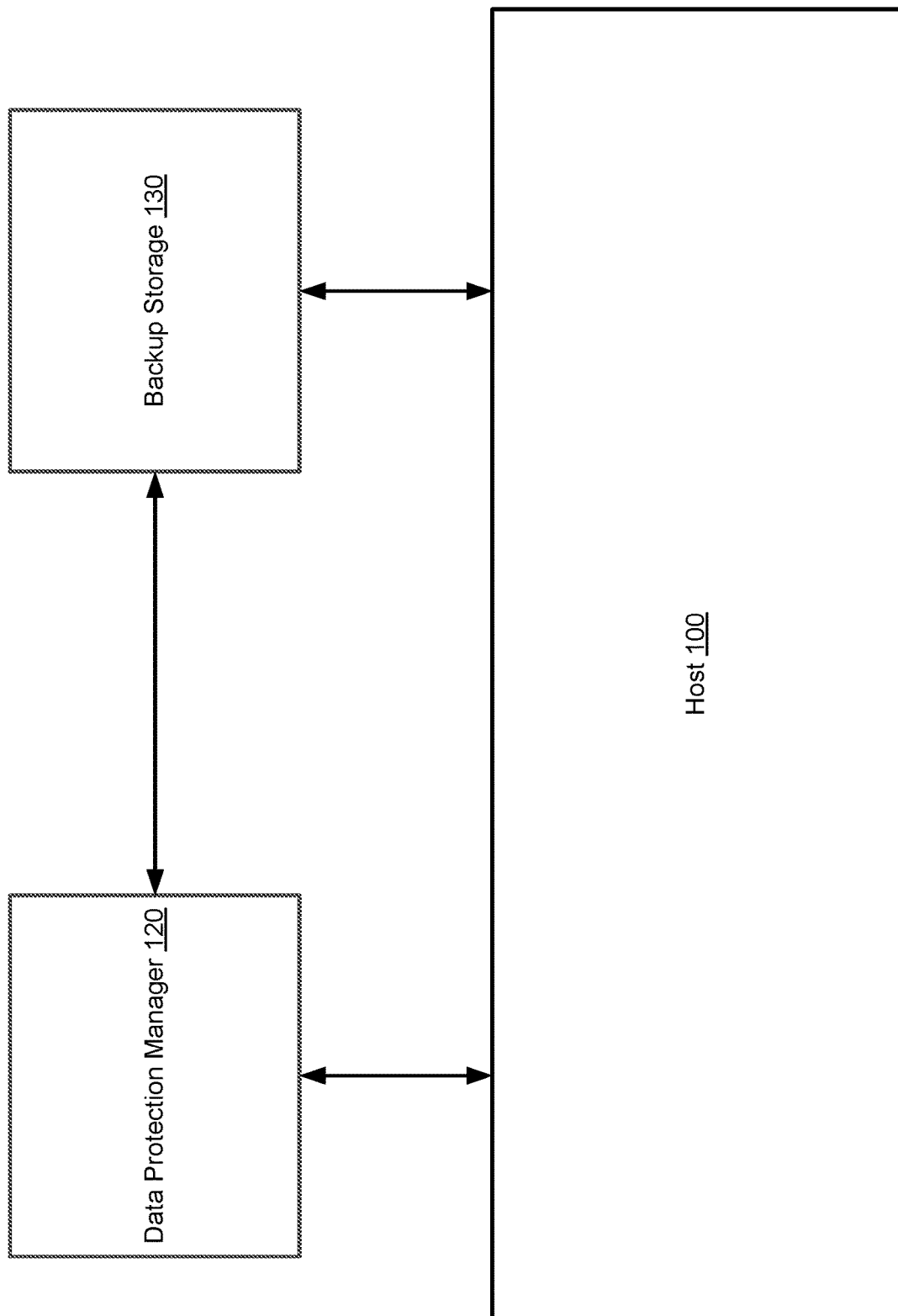
FIG. 1A shows a diagram of a system in accordance with one or more embodiments disclosed herein.

Specific embodiments will now be described with reference to the accompanying figures. In the following description, numerous details are set forth as examples of the embodiments disclosed herein. It will be understood by those skilled in the art that one or more embodiments disclosed herein may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to methods, systems, and/or non-transitory computer readable mediums for expanding discovery of assets to generate backups of existing snapshots.

Users may use multiple methods and native tools to protect their environments to meet their various service level agreements (SLAs) and other organization-wide policies or interim stop-gap solutions. Most of these techniques include generating snapshots because snapshots provide more flexibility, as they do not need to store data anywhere. Snapshots may just maintain the point-in-time copy on the host itself. Sometimes these snapshots may be lost when a source reboots, gets corrupted, or when a system starts running low on free space. In these scenarios, the system may automatically delete the oldest snapshots. Many users may desire or expect to protect these snapshots so that a data protection manager can manage them for restoration purposes.

To address, at least in part, the aforementioned issues discussed above, embodiments disclosed herein relate to systems, methods, and/or non-transitory computer readable mediums that enhance the asset discovery of a host beyond regular practices. More specifically, once discovery has data about the existing snapshots (their ages, types, etc.), this data may then be converted into backup schedules for pseudo-assets that include the existing snapshots. These snapshots may be backed up to backup storages using regular backup procedures and may be treated as regular backup copies associated with the corresponding asset and later managed by data protection manager for restoration purposes. As a result, the flexibility, scale, accuracy, and efficiency of backing up data on a host may be improved.

FIG. 1A shows a diagram of a system in accordance with one or more embodiments disclosed herein. The system may include a host (100), a data protection manager (120), and backup storages (130). The components of the system illustrated in FIG. 1A may be operatively connected to each other and/or operatively connected to other entities (not shown) via any combination of wired (e.g., Ethernet) and/or wireless networks (e.g., local area network, wide area network, Internet, etc.) without departing from embodiments disclosed herein. Each component of the system illustrated in FIG. 1A is discussed below.

In one or more embodiments, the host (100) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the host (100) described herein and/or all, or a portion, of the methods illustrated in FIGS. 2A-3B. The host (100) may be implemented using other types of computing devices without departing from the embodiments disclosed herein. For additional details regarding computing devices, refer to FIG. 4.

The host (100) may be implemented using logical devices without departing from the embodiments disclosed herein. For example, the host (100) may include virtual machines that utilize computing resources of any number of physical computing devices to provide the functionality of the host (100). The host (100) may be implemented using other types of logical devices without departing from the embodiments disclosed herein.

In one or more embodiments, the host (100) may include the functionality to, or otherwise be programmed or configured to, perform computer implemented services for users of the host (100). The computer implemented services may include electronic mail communication services, database services, calendar services, inferencing services, and/or word processing services. The computer implemented services may include other and/or additional types of services without departing from embodiments disclosed herein. The host (100) may also include the functionality to perform local data protection services. The local data protection services may include generating backups, generating backup metadata, providing backups to the backup storages (130), providing backup metadata to the data protection manager (120), and performing backup access services (also referred to as application instant access). The local data protection services may include other and/or additional services without departing from embodiments disclosed herein. The host (100) may include the functionality to perform all, or a portion, of the methods discussed in FIGS. 2A-3B. The host (100) may include other and/or additional functionalities without departing from embodiments disclosed herein. For additional information regarding the host, refer to FIG. 1B.

In one or more embodiments, the data protection manager (120) may be implemented using one or more computing devices. A computing device may be, for example, mobile phones, tablet computers, laptop computers, desktop computers, servers, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described herein and/or all, or a portion, of the methods illustrated in FIGS. 2A-3B. The data protection manager (120) may be implemented using other types of computing devices without departing from embodiments disclosed herein. For additional details regarding computing devices, refer to FIG. 4.

In one or more embodiments, the data protection manager (120) may be implemented using logical devices without departing from embodiments disclosed herein. For example, the data protection manager (120) may include virtual machines that utilize computing resources of any number of physical computing devices to provide the functionality of the data protection manager (120). The data protection manager (120) may be implemented using other types of logical devices without departing from the embodiments disclosed herein.

In one or more embodiments, the data protection manager (120) may include the functionality to, or may be otherwise programmed or configured to, perform data protection management services for the data generated on the host (100). The data protection management services may include: (i) initiating the performance of data protection services by a data protection agent (discussed below) executing on the host based on user requests and/or protection policies, (ii) maintaining backup metadata associated with backups, and (iii) generating and providing a user interface based on the backup metadata that provides users with an item level view of backups and an asset and pseudo-asset level view of data stored on the host.

The data protection management services may include other and/or additional services without departing from embodiments disclosed herein. The data protection manager (120) may include the functionality to perform all, or a portion, of the methods of FIGS. 2-4. The data protection manager (120) may include other and/or additional functionalities without departing from embodiments disclosed herein. For additional information regarding the data protection manager (120), refer to FIG. 1C.

In one or more embodiments, the backup storages (130) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the backup storages (130) described herein and/or all, or a portion, of the methods illustrated in FIGS. 2A-3B. The backup storages (130) may be implemented using other types of computing devices without departing from the embodiments disclosed herein. For additional details regarding computing devices, refer to FIG. 4.

The backup storages (130) may be implemented using logical devices without departing from the embodiments disclosed herein. For example, the backup storages (130) may include virtual machines that utilize computing resources of any number of physical computing devices to provide the functionality of the backup storages (130). The backup storages (130) may be implemented using other types of logical devices without departing from the embodiments disclosed herein.

In one or more embodiments, the backup storages (130) may include the functionality to, or otherwise be programmed or configured to, obtain and store backups generated on the host (100). The backup storages (130) may also include the functionality to provide all, or a portion, of the backups stored on the backup storages (130) to the host (100) for item level recovery or item level access purposes. The backup storages (130) may include the functionality to perform all, or a portion, of the methods discussed in FIGS. 2A-3B. The backup storages (130) may include other and/or additional functionalities without departing from embodiments disclosed herein.

In one or more embodiments disclosed herein, the backup storages (130) may include one or more backup storages. The backup storages (130) may include any quantity of backup storages without departing from embodiments disclosed herein. In one or more embodiments, a backup storage of the backup storages (130) may include a backup storage type. The backup storages (130) may include any quantity and/or combination of backup storage types without departing from embodiments disclosed herein. Each backup storage type may be associated with a particular backup storage format or backup storage functionality. A backup storage type may include, a block-based backup storage, a file system-based backup storage, and/or an object-based backup storage. A block-based backup storages may store backups as one or more data blocks. A file system-based backup storage may store backups as one or more files and/or folders. An object-based backup storage may store backups as one or more objects. Other and/or additional types of backup storages may be included in the backup storages (130) without departing from embodiments disclosed herein.

Although the system of FIG. 1A is shown as having a certain number of components (e.g., 100, 120, 130), in other embodiments disclosed herein, the system may have more or fewer components. For example, the functionality of each component described above may be split across components or combined into a single component. Further still, each component may be utilized multiple times to carry out an iterative operation.

Figure 1B:
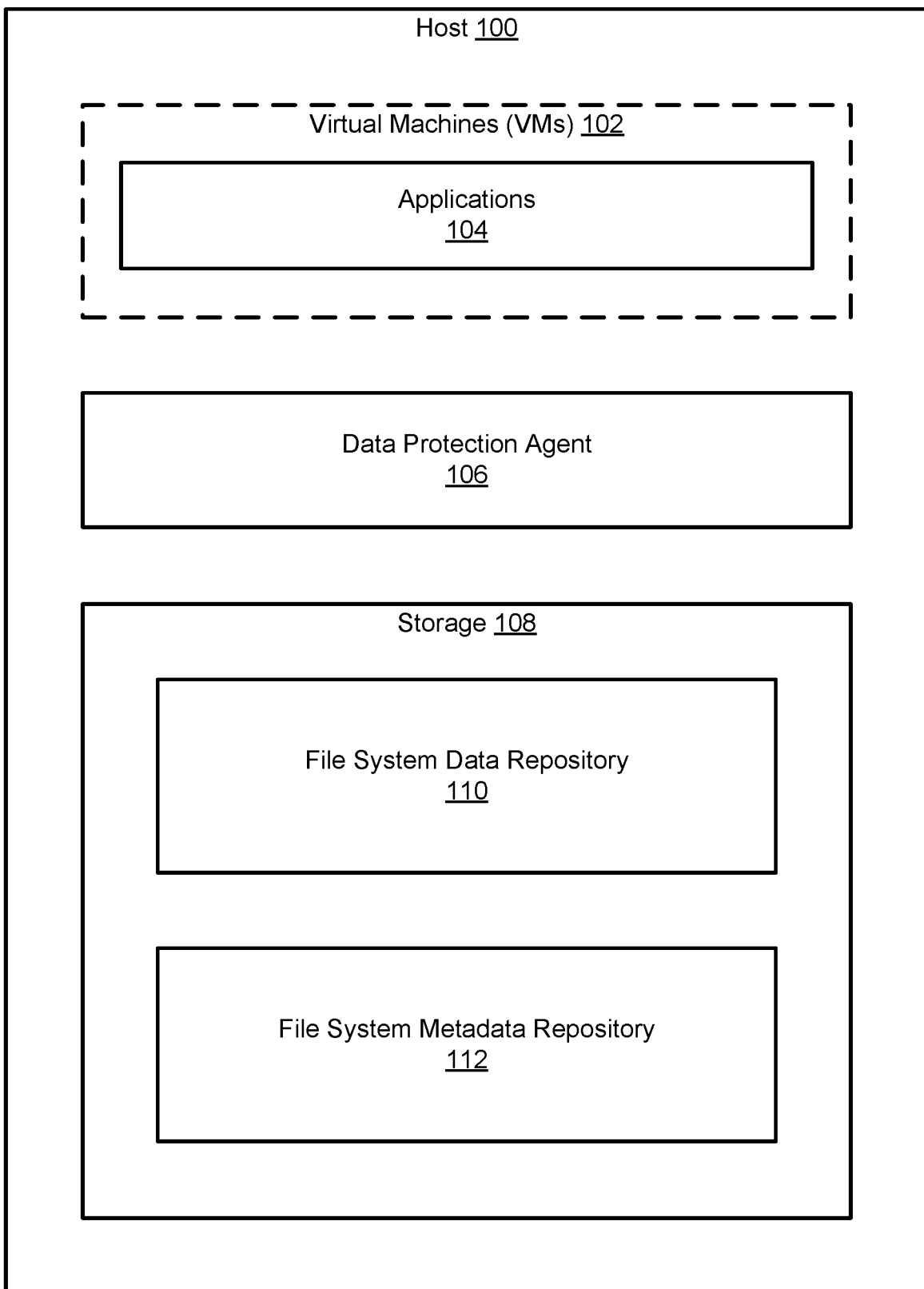
FIG. 1B shows a diagram of a host in accordance with one or more embodiments disclosed herein.

FIG. 1B shows a diagram of a host in accordance with one or more embodiments disclosed herein. The host (100) may be an embodiment of the host (100, FIG. 1A) discussed above. As discussed above, the host (100) may include the functionality to perform computer implemented services and local data protection services. To perform the aforementioned services, the host (100) may include a virtual machines (102), applications (104), a data protection agent (106), and storage (108). The host (100) may include other, additional, and/or fewer components without departing from embodiments disclosed herein. For example, the host may include multiple data protection agents if multiple applications require distinct backup generation functionalities. As yet another example, the host may include multiple virtual machines. Each of the aforementioned components of the host (100) is discussed below.

In one or more embodiments disclosed herein, the virtual machines (102) are implemented as computer instructions, e.g., computer code, stored on a storage (e.g., 108) that when executed by a processor of the host (100) causes the host (100) to provide the functionality of the virtual machines (102) described throughout this Detailed Description. The virtual machine may include the functionality to perform or otherwise provide computer implemented services to users. The virtual machine may include other and/or additional functionalities without departing from embodiments disclosed herein. The virtual machine may be managed by a hypervisor (e.g., computing instructions executing on the host (100)) (not shown). For example, the hypervisor may be a Hyper-V hypervisor. The hypervisor may generate image backups (full and incremental) of VMs (102) executing on the host (100). The virtual machines (102) may include one or more applications (104). Each application may be a portion of the computer instructions discussed above, which when executed by a processor of the host (100), cause the host (100) to perform a portion of the computer implemented services performed by the virtual machines (102). For example, a database application may perform database services, a word processing application may perform word processing services, and an electronic mail communication application may perform electronic mail communication services, etc.

In one or more embodiments disclosed herein, the data protection agent (106) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the data protection agent (106) described throughout this Detailed Description.

In one or more embodiments disclosed herein, the data protection agent (106) is implemented as computer instructions, e.g., computer code, stored on a storage (e.g., 108) that when executed by a processor of the host (100) causes the host (100) to provide the functionality of the data protection agent (106) described throughout this Detailed Description.

In one or more embodiments disclosed herein, the data protection agent (106) is implemented using one or more external computing devices. Although such an implementation is not shown in the systems of FIG. 1A or FIG. 1B, the one or more computing devices may be operatively connected to the host (100) enabling the data protection manager to remotely interact with the host (100). For additional information regarding computing devices, refer to the discussion above with respect to FIG. 1A or the discussion below with respect to FIG. 4.

In one or more embodiments, the data protection agent (106) may include the functionality to perform the aforementioned local data protection services of the host (100). To perform the local data protection services, the data protection agent (106) may obtain requests and information from the data protection manager (120, FIG. 1A), as well as send and respond to commands between the backup storages (130, FIG. 1A) and the virtual machines (102) and the applications (104). The sending and responding to the commands may result in the performance of all, or a portion, of the methods discussed in FIGS. 2-4. The commands may be associated with an Internet Protocol, such as for example, Internet Small Computer Systems Interface (iSCSI). For additional information regarding the functionality of the data protection agent (106), refer to FIGS. 2-4.

In one or more embodiments, the storage (108) may be implemented using one or more volatile or non-volatile storages or any combination thereof. The storage (108) may include the functionality to, or otherwise be configured to, store and provide all, or portions, of information that may be used by the virtual machines (102), applications (104), and/or the data protection agent (106). The information stored in the storage (108) may include a file system data repository (110) and a file system metadata repository (112). The storage may include other and/or additional information without departing from embodiments disclosed herein. Each of the aforementioned types of information is discussed below.

In one or more embodiments disclosed herein, the applications (104) and/or users of the applications (104) generate data during the performance of computer implemented services. The data may be stored in a file system. In one or more embodiments disclosed herein, a file system is an organizational data structure that tracks how application data is stored and retrieved in a system (e.g., in storage (108) of the host (100), i.e., the file system data repository (110)). The file system may specify references to assets of applications and any asset data associated with each asset. An asset may be an individual data object in the file system. An asset may be, for example, an application (104), a virtual machines (102) or the entirety of the file system. Each asset may include any number of elements (e.g., sub-assets). The elements may be, for example, snapshots, backup images, folders and/or files associated with the asset (e.g., 102). Each file may include file data. The file data may include, for example, database data, calendar data, electronic mail communications data, etc.

In one or more embodiments, the file system data repository (110) may include one or more data structures that may be used to generate backups. The file system data repository (110) may include file data generated by the applications (104) and/or users of the applications (104) as discussed above. The file data may be any type of data such as database data and email data generated by users of the applications (104) without departing from the invention. Each asset (e.g., VM (102), applications (104), or file system) may be associated with any number of sub-assets (e.g., files, snapshots, backup images, folders, etc.), each sub-asset may include any quantity of file data, and furthermore, each asset may include any number of elements without departing from embodiments disclosed herein. Users and/or applications (104) may use the file data of the file system data repository (110) when obtaining computer implemented services from the host (100). Additionally, the file data of the file system data repository (110) may be obtained by the data protection agent (106) to generate backups. The file data of the file system data repository (110) may be used by other and/or additional entities for other and/or additional purposes without departing from embodiments disclosed herein. Additionally, the file system data repository (110) may include other and/or additional types of information without departing from embodiments disclosed herein.

In one or more embodiments, the file system metadata repository (112) may include one or more data structures that include information regarding files included in the file system stored in the file system data repository (110). The information may include, for example, an entry for each file that includes: file identifiers associated with the file, the file length or size, one or more data runs associated with one or more data blocks of the file, data block identifiers associated with the one or more data blocks of the file, the creation date, the modification date, the asset identifier associated with the file, and a parent file or folder associated with the file. The file system metadata repository (112) may include other and/or additional information associated with the files stored in the file system data repository (110) (as discussed below in FIGS. 2-4) without departing from embodiments disclosed herein. The file system metadata repository (112) may be used by the users of the applications (104), virtual machines (102), and/or the applications (104) during the performance of computer implemented services. The file system metadata repository (112) may be used by the data protection agent (106) to generate backups, backup metadata (discussed below), snapshot metadata (discussed below), and slack metadata (discussed below). The information included in the file system metadata repository (112) may be generated by the VM (102), applications (104), the host operating system, and/or users of the applications (104) during the performance of computer implemented services and stored in the file system metadata repository (112).

While the above data structures (e.g., 110, 112) and other data structures mentioned in this Detailed Description are illustrated/discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (108), any of the aforementioned data structures may be stored in different locations (e.g., in storage of other computing devices) and/or spanned across any number of computing devices without departing from embodiments disclosed herein. The data structures discussed in this Detailed Description may be implemented using, for example, file systems, lists, linked lists, tables, unstructured data, databases, etc.

Figure 1C:
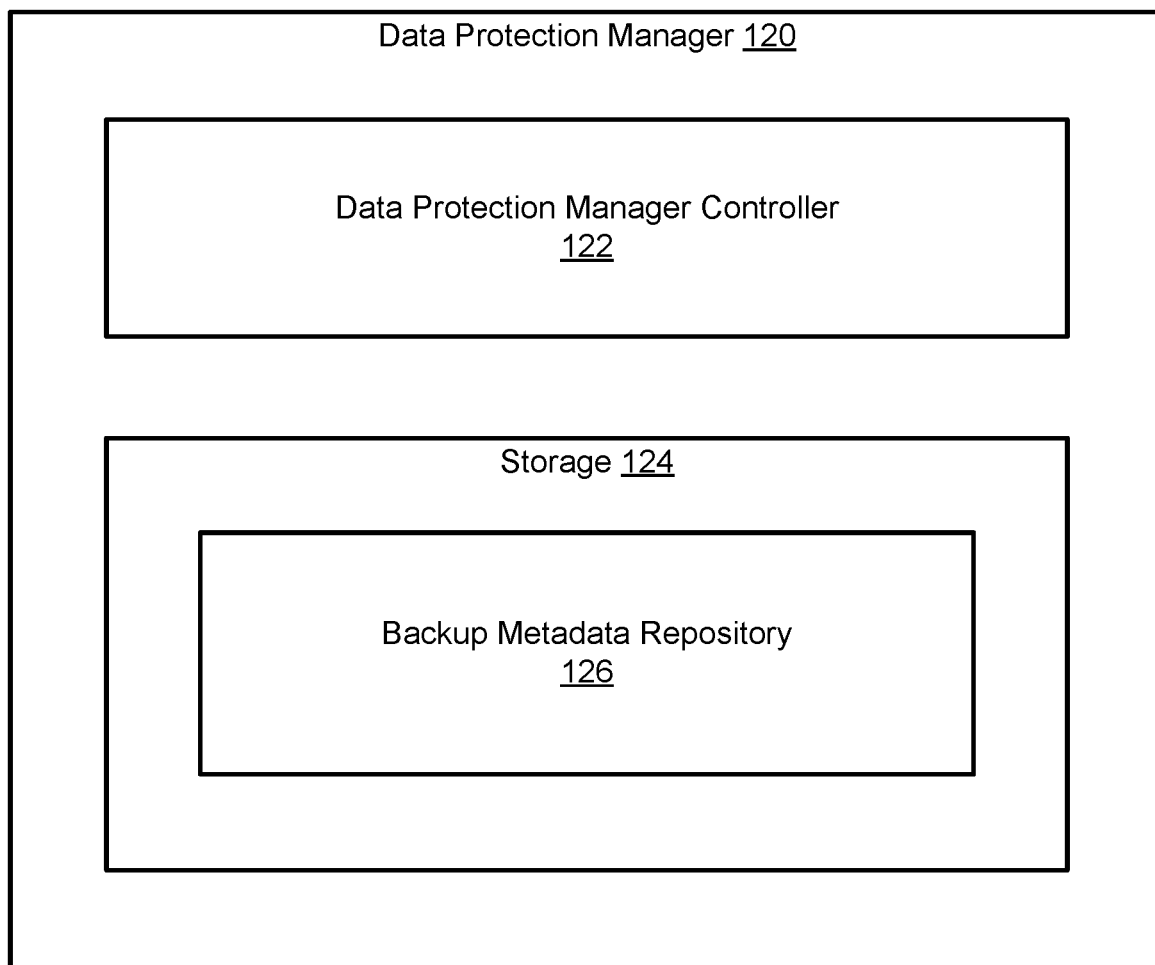
FIG. 1C shows a diagram of a data protection manager in accordance with one or more embodiments disclosed herein.

FIG. 1C shows a diagram of a data protection manager in accordance with one or more embodiments disclosed herein. The data protection manager (120) may be an embodiment of the data protection manager (120, FIG. 1A) discussed above. As discussed above, the data protection manager (120) may include the functionality to perform data protection management services. To perform the aforementioned services, the data protection manager (120) may include a data protection manager controller (122) and storage (124). The data protection manager (120) may include other, additional, and/or fewer components without departing from embodiments disclosed herein. Each of the aforementioned components of the data protection manager (120) is discussed below.

In one or more embodiments disclosed herein, the data protection manager controller (122) may be implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the data protection manager controller (122) described throughout this Detailed Description.

In one or more embodiments disclosed herein, the data protection manager controller (122) is implemented as computer instructions, e.g., computer code, stored on a storage (e.g., 124) that when executed by a processor of the data protection manager (120) causes the data protection manager (120) to provide the functionality of the data protection manager controller (122) described throughout this Detailed Description.

In one or more embodiments, the data protection manager controller (122) may include the functionality to perform the aforementioned data protection management services. To perform the data protection management services, the data protection manager controller (122) may send requests and information to the data protection agent (106, FIG. 1B) to initiate the generation of backups and backup access services. The data protection manager controller (122) may perform all, or a portion, of the methods discussed in FIGS. 2-4. For additional information regarding the functionality of the data protection manager controller (122), refer to FIGS. 2-4.

In one or more embodiments, the storage (124) may be implemented using one or more volatile or non-volatile storages or any combination thereof. The storage (124) may include the functionality to, or otherwise be configured to, store and provide all, or portions, of information that may be used by users of the system and the data protection agent (106) to perform backup access services and/or other data protection services without departing from embodiments disclosed herein. The information stored in the storage (124) may include a backup metadata repository (126). The storage (124) may include other and/or additional information without departing from embodiments disclosed herein.

In one or more embodiments, the backup metadata repository (126) may include one or more data structures that include information regarding backups of the data generated on the host (100, FIG. 1A). The information may include, for example, for each backup, a backup identifier, a backup generation timestamp, and a storage location included in the backup storage. The information may also include, for each file in a backup: a file identifier associated with the file, a file name associated with the file, the file length or size, data runs, the asset identifier associated with the file, and a parent file or folder associated with the file. The information may further include application information associated with the backups such as an application identifier, an application name, and an application type (e.g., database application, a word processing application, etc.). The backup metadata repository may include snapshot backup metadata (discussed below in FIGS. 1-3B) and slack metadata (discussed below in FIG. 4).

The backup metadata repository (126) may include other and/or additional information associated with backups of the data generated on the host (100, FIG. 1A) without departing from embodiments disclosed herein. The backup metadata repository (126) may be used by the data protection agent (106, FIG. 1B) during the performance of backup access services. The information included in the backup metadata repository (126) may be generated by the data protection agent (106, FIG. 1B) during the backup generation and backup access services and stored in the backup metadata repository (126).

While the data structures (e.g., 126) and other data structures mentioned in this Detailed Description are illustrated/discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while illustrated as being stored in the storage (124), any of the aforementioned data structures may be stored in different locations (e.g., in storage of other computing devices) and/or spanned across any number of computing devices without departing from embodiments disclosed herein. The data structures discussed in this Detailed Description may be implemented using, for example, file systems, lists, linked lists, tables, unstructured data, databases, etc.

Figure 2:
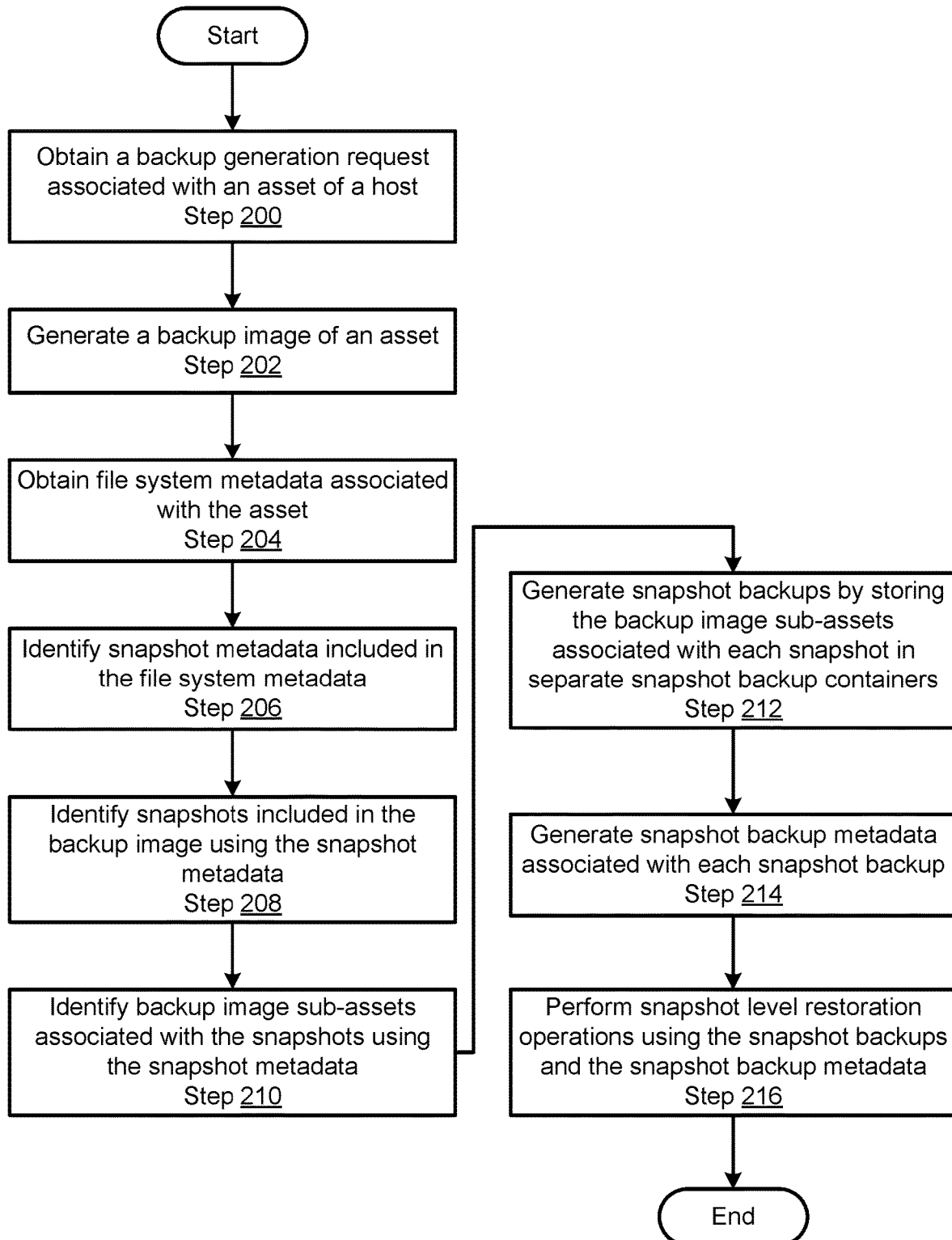
FIG. 2 shows a flowchart of a method for splitting an image backup into multiple snapshot backups in accordance with one or more embodiments disclosed herein.

FIG. 2 shows a flowchart of a method for splitting an image backup into multiple snapshot backups in accordance with one or more embodiments disclosed herein. The method shown in FIG. 2 may be performed by, for example, a data protection agent (e.g., 106, FIG. 1B). Other components of the system in FIGS. 1A-1C may perform all, or a portion, of the method of FIG. 2 without departing from the scope of the embodiments described herein. While FIG. 2 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 200, a backup generation request associated with an asset of a host is obtained. In one or more embodiments, the data protection agent may obtain a request to generate a backup from the data protection manager. The request may include an asset identifier associated with the asset targeted by the request. In one or more embodiments, the request may include backup storage information associated with one or more backup storages in which the to-be generated backup is to be stored. The backup storage information may include the backup storage identifier, a backup storage type, and/or connection information (e.g., network address, IP address, etc.). The request may include other and/or additional information associated with backup generation without departing from embodiments disclosed herein. The request may be provided to the data protection agent using any appropriate method of data transmission without departing from embodiments disclosed herein. For example, the data protection manager may transmit the request as a message that includes one or more network packets through one or more network devices that operatively connect the data protection agent to the data protection manager.

In one or more embodiments, the data protection manager may send the request based on a protection policy associated with the asset. The protection policy may be a data structure that specifies backup requirements (e.g., a backup schedule specifying points in time to generate backups, backup storage information associated with one or more backup storages to store the backup and/or portions of the backup, a retention period specifying an amount of time to keep the backup before deleting the backup, etc.). The protection policies may be generated by users and provided to the data protection manager, which may monitor the protection policies to initiate the performance of data protection services according to the backup requirements specified by the protection policy.

In another embodiment, the data protection manager may send the backup generation request in response to an on-demand backup generation request submitted by a user of the system. The user may submit the on-demand backup generation request through any type of user interface (e.g., graphical user interface) without departing from embodiments disclosed herein. The on-demand backup generation request may include backup storage information associated with one or more backup storages to store the backup and/or portions of the backup and/or other information associated with the backup generation without departing from embodiments disclosed herein.

The backup generation request associated with the asset of the host may be obtained via other and/or additional methods without departing from embodiments disclosed herein.

In Step 202, a backup image of the asset is generated. In one or more embodiments, the data protection manager may use any appropriate backup image generation technique without departing from embodiments disclosed herein. In one embodiment, the data protection agent may generate the backup image. In an alternative embodiment, the data protection agent may initiate the generation of the backup image by one or more other entities or services (e.g., Volume Shadow-Copy Service (VSS), Logical Volume Manager, etc.). The backup image may be stored locally within a storage of the host. The backup image may be reflected in the file system data and file system metadata of the host. As part of generating the backup image, snapshots of sub-assets (e.g., files, objects, folders, etc.) associated with the asset may be generated and included in the backup image. A snapshot may represent the state of a particular sub-asset at a point in time. The backup image of the asset may be generated via other and/or additional methods without departing from embodiments disclosed herein.

In Step 204, file system metadata associated with the asset is obtained. As discussed above, the storage of the host may include file system metadata repository that stores information associated with backup images, snapshots, files, folders, and/or other objects included in the file system of the host generated by a user, virtual machines (VMs), and/or applications of the host during the performance of computer implemented services and/or data protection services. The data protection agent may obtain file system metadata associated with the asset (e.g., an application for an application backup), the entirety of the file system (e.g., for a file system backup), or with a VM (e.g., for a VM backup) from the file system metadata repository. The data protection agent may use the asset identifier to obtain file system metadata associated with the asset. The data protection agent may use other appropriate methods, frameworks, or techniques to obtain file system metadata and other information regarding assets of the host (e.g., a Volume Shadow Copy Service (VSS)). The file system metadata associated with the asset may be obtained via other and/or additional methods without departing from embodiments disclosed herein.

In Step 206, snapshot metadata included in the file system metadata is identified. As discussed above, the file system metadata may include information associated with the generated backup image and snapshots included in the backup image. In one or more embodiments, the data protection agent may use any appropriate information included in the file system metadata to identify portions of the file system metadata that includes snapshot metadata, which is file system metadata that includes information associated with the snapshots included in the backup image, without departing from embodiments disclosed herein. For example, the data protection agent may use the backup image identifier and snapshot file types to identify snapshot metadata. The data protection agent may identify all file system metadata that are associated with the backup image using the backup image identifier. The data protection agent may then identify within the identified file system metadata portions of the file system metadata that include snapshot metadata using the snapshot file type. The resulting identified file system metadata may include the snapshot metadata. The snapshot metadata included in the file system metadata may be identified via other and/or additional methods without departing from embodiments disclosed herein.

In Step 208, snapshots included in the backup image are identified using the snapshot metadata. The snapshot metadata may include snapshot identifiers and storage locations associated with snapshots included in the backup image. The snapshot identifiers may specify particular snapshots and the storage locations may specify where the data of the snapshot is stored. Each storage location may be associated with a snapshot identifier. The storage locations may include one or more data runs and lengths associated with files included in a snapshot. Accordingly, the data protection agent may identify snapshots in the backup image using the snapshot identifiers and the storage locations included in the snapshot metadata. The snapshots included in the backup image may be identified using snapshot metadata via other and/or additional methods without departing from embodiments disclosed herein.

In Step 210, the backup image sub-assets associated with the snapshots are identified using the snapshot metadata. In one or more embodiments, the data protection agent may identify backup image sub-assets associated with each snapshot of the identified snapshots. A snapshot may include or be associated with one or more files. Each of the aforementioned files may be identified as a backup image sub-asset. For each snapshot, the data protection agent may identify file identifiers included in the snapshot metadata associated with the snapshot (e.g., all file identifiers associated with the snapshot identifier). The data protection agent may then identify all files corresponding to the identified file identifiers as backup image sub-assets associated with the snapshot. The backup image sub-assets associated with the snapshots may be identified using the snapshot metadata via other and/or additional methods without departing from embodiments disclosed herein.

In Step 212, snapshot backups are generated by storing the backup image sub-assets associated with each snapshot in separate snapshot backup containers. In one or more embodiments, the data protection agent may write data associated with each backup image sub-assets associated with a snapshot into a separate snapshot backup container on a backup storage based on backup storage information (discussed above) included in the backup generation request. The data protection agent may identify the data associated with the backup image sub-assets corresponding to each snapshot using storage locations associated with each snapshot. The storage locations may include one or more data runs (discussed below) associated with each file identifier. Each snapshot backup container may be associated with a particular snapshot included in the backup image. Each snapshot container may further include the backup image sub-assets associated with the corresponding snapshot. Accordingly, instead of generating a single backup of the entirety of the backup image, the backup image may be split into multiple snapshot backups. Thus, the multiple snapshot backups may be used to perform snapshot level restorations (discussed below). Snapshot backups may be generated by storing the backup image sub-assets associated with each snapshot in separate snapshot backup containers via other and/or additional methods without departing from embodiments disclosed herein.

In one or more embodiments, a data run may be associated with a data of a file. The data may be stored as a span of data such as a data block. Each file may include one or more data blocks. A data run may include an offset and length. An offset may refer to one or more data structures that specify the distance from a reference point in a file system-based backup storage that includes the start of a file in the storage volume (e.g., virtual hard disk on the host or the backup storage). The distance may refer to the number of physical addresses or the quantity of data (e.g., bytes) between a reference point in the storage and the start of a file. The reference point may be a physical address that includes the first file of the backup or a base address in a storage. Since the snapshot may be stored according to the hierarchy of files included in the storage, the offset may be used to collect only a specifically requested file in the backup image. The offset may be derived from the backup image itself or from the file system metadata (e.g., the parent file identifiers and the size or lengths of each file). The offset may include other and/or additional information without departing from embodiments disclosed herein.

In one or more embodiments, lengths may refer to one or more data structures that specify where a data and/or portions of data (e.g., sectors, data blocks, etc.) of a file begin and end in the storage of the host and/or the backup storage. The lengths may be obtained by the data protection agent based on the file system metadata and/or the backup image. The lengths may be pointers that reference locations in a backup storage where a data block or portion of a data block of a backup begins and ends. The lengths may be used to identify and obtain specific files or portions of files. Each length may be associated with a data block or a portion of a data of a file. Each length may be mapped to, or otherwise associated with, a file identifier of a file in the file system. The lengths may include other and/or additional information and may be used for other and/or additional purposes without departing from embodiments disclosed herein.

In Step 214, snapshot backup metadata associated with each snapshot backup is generated. In one or more embodiments, the data protection agent may generate snapshot backup metadata based on the snapshot backups and the file system metadata. The data protection agent may generate a backup metadata file and include all, or a portion, of the snapshot metadata in the snapshot backup metadata file. As a result, the snapshot backup metadata may include, for each snapshot, an asset identifier, a snapshot identifier, one or more file identifiers and file names associated with the file in the backup image sub-assets, the data runs associated with each file, and a parent file or folder associated with the file. The snapshot backup metadata may include other and/or additional information without departing from embodiments disclosed herein.

The data protection agent may also include backup information in the snapshot backup metadata which may include an assigned backup identifier associated with the backup, snapshot backup identifiers associated with each snapshot backup, the snapshot backup containers associated with each snapshot backup, a creation timestamp associated with the backup, and the backup storage for the backup (e.g., as specified by the backup request obtained from the data protection manager). If more than one backup storage is used to store portions of the backup, the backup metadata file may be updated to include multiple instances of backup information associated with each backup storage. The snapshot backup metadata may be provided to the data protection manager, which may in turn provide the snapshot backup metadata to a user. The backup metadata may be generated based on the file system metadata and the snapshot backups via other and/or additional methods without departing from embodiments disclosed herein.

In Step 216, a snapshot level restoration operation is performed using the snapshot backups and the snapshot backup metadata. In one or more embodiments, the data protection agent may obtain a restoration request from the data protection manager. The restoration request may include one or more snapshot identifiers and a backup identifier, instead of the backup image identifier. Accordingly, the data protection agent may then obtain the snapshot backups associated with the backup identifier corresponding to each snapshot identifier using the snapshot backup metadata. The data protection agent may then restore the files included in the snapshot backups instead of restoring the entire asset using the backup image. Thus, the flexibility and efficiency of restoring assets may be improved.

In addition to restoring portions of assets, the snapshot backups may be used to increase redundancy. Instead of losing an entire backup image when the backup image is lost, only a portion of the snapshot backups may be lost while another portion of the snapshot backups may remain available. Furthermore, the snapshot backups may increase corruption resistance. Instead of losing an entire backup image when the backup image is corrupted, only a portion of the snapshot backups may be corrupted while another portion of the snapshot backups may remain available. Other snapshot level operations may be performed using the snapshot backups without departing from embodiments disclosed herein. The snapshot level restoration operation may be performed using the snapshot backups and the snapshot backup metadata via other and/or additional methods without departing from embodiments disclosed herein.

In one or more embodiments, the method ends following Step 216.

Figure 3A:
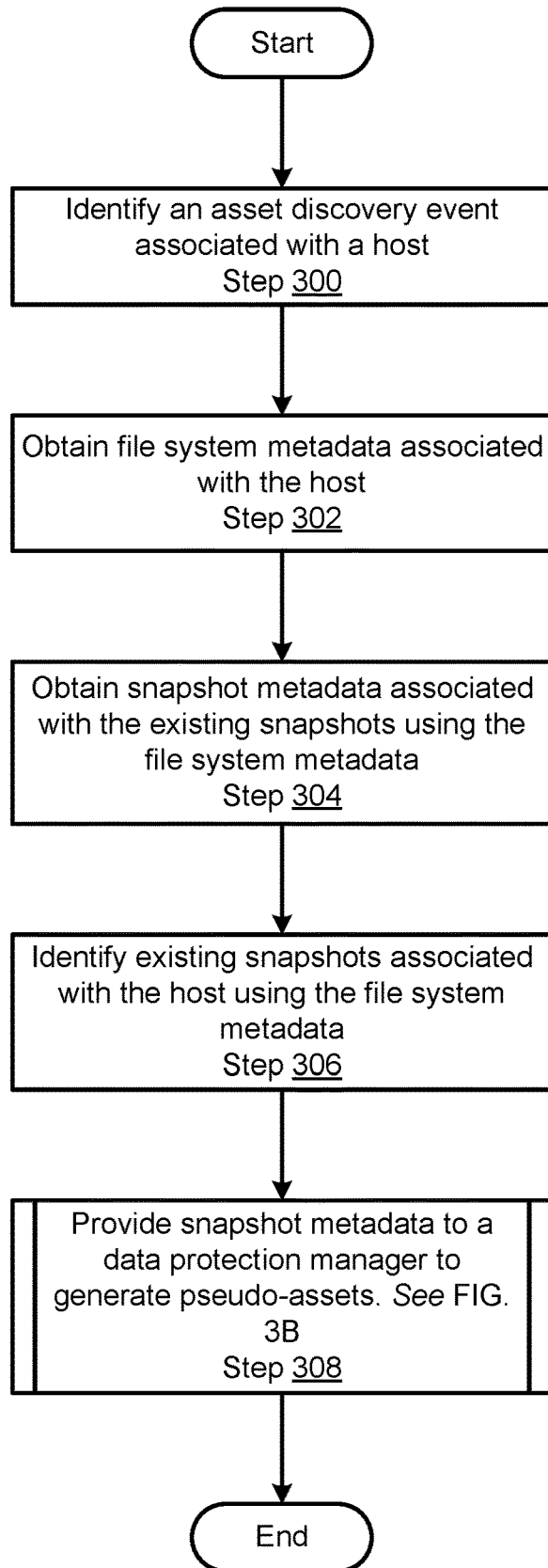
FIG. 3A shows a flowchart of a method for performing discovery of pseudo-assets in accordance with one or more embodiments disclosed herein.

FIG. 3A shows a flowchart of a method for performing discovery of pseudo-assets in accordance with one or more embodiments disclosed herein. The method shown in FIG. 3A may be performed by, for example, a data protection agent (e.g., 106, FIG. 1B). Other components of the system in FIGS. 1A-1C may perform all, or a portion, of the method of FIG. 3A without departing from the scope of the embodiments described herein. While FIG. 3A is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 300, an asset discovery event associated with a host is identified. In one or more embodiments, the data protection agent may obtain a request to perform asset discovery on a file system of a host from a data protection manager. The request may be initiated by a user directly through a data protection manager user interface (e.g., a graphical user interface, a command-line interface, etc.) or indirectly through a client (not shown in the system of FIG. 1A) used by the user. The data protection agent may identify the receipt of the request as the asset discovery event. The request may include a timestamp specifying a point in time after which assets and sub-assets were generated that are to be discovered in the file system. The request may include other and/or additional information associated with discovery event without departing from embodiments disclosed herein.

In other embodiments, the data protection agent may perform asset discovery based on a schedule. For example the data protection agent may perform a discovery event every hour. The data protection agent may identify the occurrence of a point in time specified by the schedule as the asset discovery event.

In yet other embodiments, the data protection agent monitor the file system on the host. The data protection agent may check for changes (e.g., added files, modified files, deleted files, etc.) in the file system. The data protection manager may identify the occurrence of a change of the file system or a number of changes of the file system (e.g., above a change threshold) as the asset discovery event.

The asset discovery event associated with the host may be identified via other and/or additional methods without departing from embodiments disclosed herein.

In Step 302, file system metadata associated with the host is obtained. As discussed above, the storage of the host may include file system metadata repository that stores information associated with backup images, snapshots, files, folders, and/or other objects included in the file system of the host generated by a user, virtual machines (VMs), and/or applications of the host during the performance of computer implemented services and/or data protection services. The data protection agent may obtain file system metadata associated with the entirety of the file system from the file system metadata repository. The data protection agent may use other appropriate methods, frameworks, or techniques to obtain file system metadata and other information regarding assets of the host (e.g., a Volume Shadow Copy Service (VSS)). The file system metadata associated with the host may be obtained via other and/or additional methods without departing from embodiments disclosed herein.

In Step 304, snapshot metadata associated with the existing snapshots is obtained using the file system metadata. As discussed above, the file system metadata may include information associated with the snapshots included in the storage of the host. In one or more embodiments, the data protection agent may use any appropriate information included in the file system metadata to identify portions of the file system metadata that includes snapshot metadata, which is file system metadata that includes information associated with the snapshots stored on the host, without departing from embodiments disclosed herein. For example, the data protection agent may use snapshot file types to identify snapshot metadata. The snapshot file type may include an indicator that the corresponding file is a snapshot. The snapshot may include multiple types of snapshots. The snapshot types may include for example, copy-on-write snapshots, incremental snapshots, continuous data protection snapshots, split-mirror snapshots, redirect-on-write snapshots, or any other type of snapshot without departing from embodiments disclosed herein. The data protection agent may then identify within the identified file system metadata portions of the file system metadata that include snapshot metadata using the snapshot file type. The resulting identified file system metadata may include the snapshot metadata. The snapshot metadata included in the file system metadata may be identified via other and/or additional methods without departing from embodiments disclosed herein.

In Step 306, existing snapshots associated with the host are identified using the snapshot metadata. The snapshot metadata may include snapshot identifiers and storage locations associated with snapshots included on the host. The snapshot identifiers may specify particular snapshots and the storage locations may specify where the data of the snapshot is stored. Each storage location may be associated with a snapshot identifier. The storage locations may include one or more data runs and lengths associated with files included in a snapshot. Accordingly, the data protection agent may identify snapshots in the backup image using the snapshot identifiers and the storage locations included in the snapshot metadata. The snapshots included on the host may be identified using snapshot metadata via other and/or additional methods without departing from embodiments disclosed herein.

In Step 308, snapshot metadata is provided to the data protection manager to generate pseudo-assets. In one or more embodiments, the data protection agent may provide the snapshot metadata associated with the identified existing snapshots to the data protection manager. The snapshot metadata may be provided to the data protection manager by the data protection manager using any appropriate method of data transmission without departing from embodiments disclosed herein. For example, the data protection agent may transmit the snapshot metadata as a message that includes one or more network packets through one or more network devices that operatively connect the data protection agent to the data protection manager. The snapshot metadata may be provided to the data protection manager to generate pseudo-assets via other and/or additional methods without departing from embodiments disclosed herein. In one or more embodiments, the pseudo-assets may be generated using the methods discussed below in FIG. 3B. For additional information regarding generating pseudo-assets, refer to FIG. 3B.

In one or more embodiments disclosed herein, the method ends following Step 308.

Figure 3B:
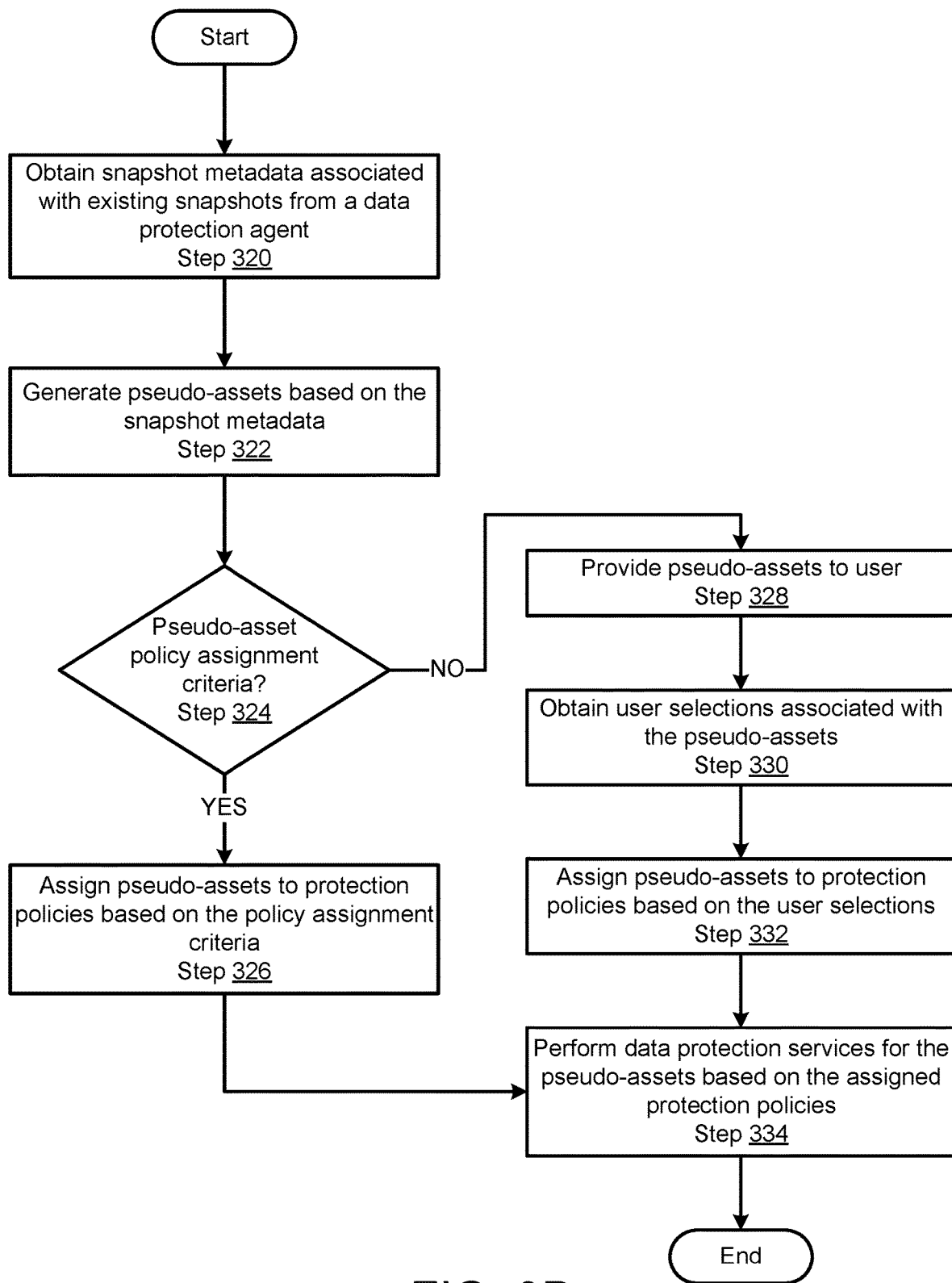
FIG. 3B shows a flowchart of a method for performing data protection services for pseudo-assets in accordance with one or more embodiments disclosed herein.

FIG. 3B shows a flowchart of a method for performing data protection services for pseudo-assets in accordance with one or more embodiments disclosed herein. The method shown in FIG. 3B may be performed by, for example, a data protection manager (e.g., 120, FIG. 1A). Other components of the system in FIGS. 1A-1C may perform all, or a portion, of the method of FIG. 3B without departing from the scope of the embodiments described herein. While FIG. 3B is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 320, snapshot metadata associated with existing snapshots is obtained from a data protection agent. The snapshot metadata may be obtained via the methods discussed above in Step 308 of FIG. 3A. For additional information regarding obtaining snapshot metadata, refer to Step 308 of FIG. 3A.

In Step 322, pseudo-assets are generated based on the snapshot metadata. As discussed above, the snapshot metadata may include snapshot identifiers and storage locations associated with existing snapshots included in the backup image. The snapshot identifiers may specify particular snapshots and the storage locations may specify where the data of the snapshot is stored. Each storage location may be associated with a snapshot identifier. The storage locations may include one or more data runs and lengths associated with files (e.g., sub-assets) included in a snapshot. In one or more embodiments, the data protection manager may generate a pseudo-asset list that includes pseudo-asset identifiers. The data protection manager may associate each snapshot identifier included in the snapshot metadata with each pseudo-asset identifier. Each pseudo-asset identifier may be associated with and correspond to at least one snapshot identifier. The pseudo-asset may be generated based on the snapshot metadata via other and/or additional methods without departing from embodiments disclosed herein.

In Step 324, a determination is made as to whether there are pseudo-asset policy assignment criteria. In one or more embodiments, the data protection manager may parse the storage of the data protection manager to identify pseudo-asset policy assignment criteria (discussed below). In one or more embodiments, if the storage includes pseudo-asset policy assignment criteria, then the data protection manager may determine that there are pseudo-asset policy assignment criteria associated with the pseudo-assets. In one or more embodiments, if the storage does not include pseudo-asset policy assignment criteria, then the data protection manager may determine that there are no pseudo-asset policy assignment criteria associated with the pseudo-assets. The determination as to whether there are pseudo-asset policy assignment criteria associated with the pseudo-assets may be made via other and/or additional methods without departing from embodiments disclosed herein.

In one or more embodiments, pseudo-asset policy assignment criteria may include one or more data structures that specify assignment rules for assigning protection policies to the pseudo-assets based on the pseudo-assets and the snapshot metadata associated with the pseudo-assets. The pseudo-asset policy assignment criteria may be generated by the user (e.g., a system administrator). The assignment rules may include, for example, mappings between asset attributes and protection policies. The mappings may include mappings between assets and protection policies, mappings between snapshot types and protection policies, mappings between snapshot creation time and protection policies, and mappings between snapshot sizes and protection policies. The pseudo-asset policy assignment criteria may include other and/or additional mappings without departing from embodiments disclosed herein.

The mappings between the assets and the protection policies may include mappings between an asset corresponding to the snapshots of the pseudo-assets and a protection policy. Accordingly, any pseudo-asset associated with the asset may be assigned the protection policy mapped to the asset. The mappings between the snapshot types and the protection policies may include mappings between a snapshot type of snapshot types and a protection policy. The mappings between snapshot creation times and protection policies may include, for example, a mapping between all pseudo-assets created before, on, or after a creation time (e.g., the time the snapshot is generated) and a protection policy. The mappings between the snapshot sizes and protection policies may include a mapping between a range of snapshot sizes (e.g., in bytes, kilobytes, megabytes, etc.) and a protection policy.

In one embodiment, the pseudo-asset policy assignment criteria may include a single mapping type. In another embodiment, the pseudo-asset policy assignment criteria may include multiple mappings. In embodiments that include multiple mappings included in the pseudo-asset policy assignment criteria, the mappings may or may not be associated with a priority to avoid conflicting assignments. The priority may be used to prioritize one mapping over another when a pseudo-asset falls under both mappings. For example, in a scenario in which the pseudo-asset policy assignment criteria include a mapping between assets and protection policies and a mapping between creation times and protection policies, the creation time mapping may include a higher priority compared to the asset mappings. Accordingly, for a pseudo-asset that falls within a creation time range included in the creation time mappings and the asset mappings, the pseudo-asset may be assigned the protection policy specified by the creation time mapping instead of the asset mapping.

In one or more embodiments disclosed herein, if it is determined that there is pseudo-asset policy assignment criteria, then the method proceeds to Step 326. In one or more embodiments disclosed herein, if it is determined that there is not pseudo-asset policy assignment criteria, then the method proceeds to Step 328.

In Step 326, pseudo-assets are assigned to protection policies based on the policy assignment criteria. As discussed above, the pseudo-asset policy assignment criteria may include a mapping between a pseudo-asset attribute and protection policies. For each pseudo-asset, the data protection manager may compare the snapshot metadata associated with the pseudo-asset with the pseudo-asset attribute included in the mapping to identify and assign the corresponding protection policy to the pseudo-asset. For example, for an asset mapping, the data protection manager may select a pseudo-asset and identify the asset identifier associated with the pseudo-asset from the snapshot metadata. The data protection metadata may then assign the protection policy corresponding to the asset identifier as specified by the asset mapping to the pseudo-asset. In embodiments where there are multiple mappings included in the pseudo-asset policy assignment criteria, the data protection manager may, for overlapping mappings associated with a pseudo-asset, use the mapping associated with the highest priority as discussed above. Accordingly, different pseudo-assets with different attributes may be automatically assigned different protection policies with different data protection requirements. The pseudo-assets may be assigned to protection policies based on the pseudo-asset assignment criteria via other and/or additional methods without departing from embodiments disclosed herein.

In Step 328, pseudo-assets are provided to a user. In one embodiment, the data protection manager may provide the pseudo-assets and the associated snapshot metadata directly to the user through a user interface of the data protection manager that displays the pseudo-assets and the snapshot metadata to the user. The user interface may include any type of user interface without departing from embodiments disclosed herein. For example, the user interface may be a graphical user interface, a command line interface, etc. In another embodiment, the data protection manager may provide the pseudo-assets and the snapshot metadata to the user indirectly by sending the dependency information to a client (not shown in the system of FIG. 1A) used by the user. The user may then access the pseudo-assets and the snapshot metadata from the client. The pseudo-assets and the snapshot metadata may be sent to the client using any appropriate method of data transmission without departing from the embodiments disclosed herein. For example, the data protection manager may transmit the pseudo-assets and the snapshot metadata as one or more messages that include one or more network packets through one or more network devices that operatively connect the data protection manager to the client. The pseudo-assets and the snapshot metadata may be provided to the user via other and/or additional methods without departing from embodiments disclosed herein.

In Step 330, user selections associated with the pseudo-assets are obtained. In one or more embodiments, the data protection manager may obtain the user selections from the user. In one embodiment, the data protection manager may obtain the user selections directly from the user through the user interface. The user may provide one or more inputs (e.g., clicking boxes using a mouse, clicking buttons using a mouse, entering commands using a keyboard, touching portions of a screen, etc.) that specify the user selections. The user selections may refer to one or more data structures that specify the protection policies assigned to each pseudo-asset by the user. In other embodiments, the data protection manager may obtain the user selections from the client. The user selections may be provided to the data protection manager using any appropriate method of data transmission without departing from embodiments disclosed herein. For example, the client may transmit the user selections as one or more messages that include one or more network packets through one or more network devices that operatively connect the data protection manager to the client. The user selections associated with the dependency information may be obtained via other and/or additional methods without departing from embodiments disclosed herein.

In Step 332, pseudo-assets are assigned to protection policies based on the user selections. As discussed above, the user selections may specify the protection policies assigned to each pseudo-asset by the user. In one or more embodiments disclosed herein, the data protection manager may parse the user selections and assign the protection policies to the pseudo-assets as specified by the user selections. The pseudo-assets may be assigned to protection policies based on the user selections via other and/or additional methods without departing from embodiments disclosed herein.

In Step 334, data protection services are performed for the pseudo-assets based on the assigned protection policies. In one or more embodiments, the data protection manager may send a request to the data protection agent of the host to perform data protection services for the pseudo-assets based on the assigned protection policy associated with each pseudo-asset. For each pseudo-asset, the request may specify the pseudo-asset, the snapshot metadata associated with the pseudo-asset, and may include the protection policy assigned to the pseudo-asset. In response to obtaining the request, the data protection agent may then perform data protection services for each pseudo-asset based on the assigned protection policy. Accordingly, flexible data protection services may be performed for existing snapshots (e.g., the pseudo-assets) based on the different protection requirements associated with the different assigned protection policies. As a result, a first pseudo-asset may be backed up according to a first backup schedule and retained based on a first retention period as specified by a first protection policy, and a second pseudo-asset may be backed up according to a second backup schedule and retained based on a second retention period as specified by a second protection policy. Data protection services may be performed for the pseudo-assets based on the assigned protection policies via other and/or additional methods without departing from the embodiments disclosed herein.

Figure 4:
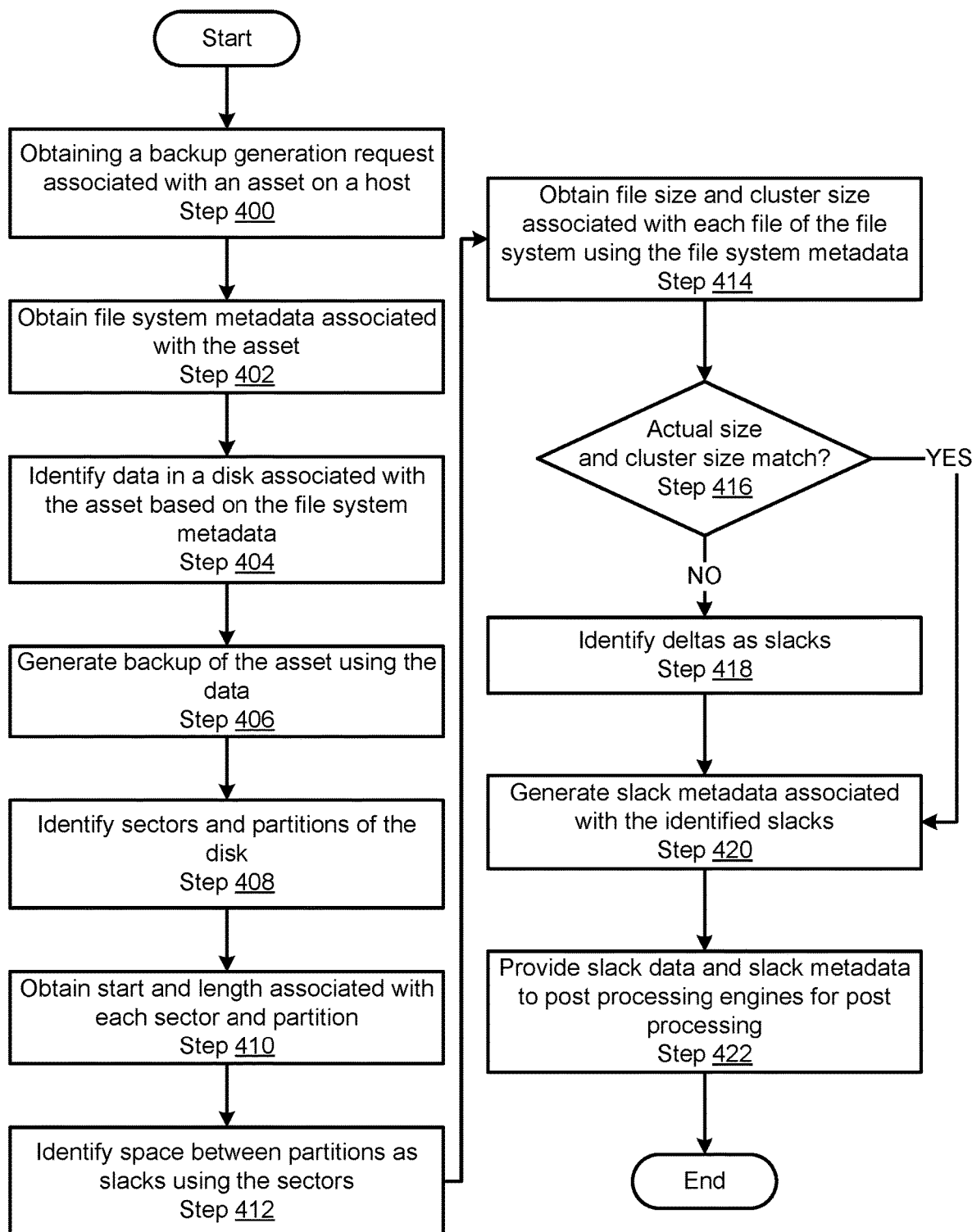
FIG. 4 shows a flowchart of a method for performing slack aware data protection services in accordance with one or more embodiments disclosed herein.

FIG. 4 shows a flowchart of a method for performing slack aware data protection services in accordance with one or more embodiments disclosed herein. The method shown in FIG. 4 may be performed by, for example, a data protection agent (e.g., 106, FIG. 1B). Other components of the system in FIGS. 1A-1C may perform all, or a portion, of the method of FIG. 4 without departing from the scope of the embodiments described herein. While FIG. 4 is illustrated as a series of steps, any of the steps may be omitted, performed in a different order, additional steps may be included, and/or any or all the steps may be performed in a parallel and/or partially overlapping manner without departing from the scope of the embodiments described herein.

Initially, in Step 400, a backup generation request associated with an asset of a host is obtained. In one or more embodiments, the data protection agent may obtain a request to generate a backup from the data protection manager. The request may include an asset identifier associated with the asset targeted by the request. In one or more embodiments, the request may include backup storage information associated with one or more backup storages in which the to-be generated backup is to be stored. The backup storage information may include the backup storage identifier, a backup storage type, and/or connection information (e.g., network address, IP address, etc.). The request may include other and/or additional information associated with backup generation without departing from embodiments disclosed herein. The request may be provided to the data protection agent using any appropriate method of data transmission without departing from embodiments disclosed herein. For example, the data protection manager may transmit the request as a message that includes one or more network packets through one or more network devices that operatively connect the data protection agent to the data protection manager.

In one or more embodiments, the data protection manager may send the request based on a protection policy associated with the asset. The protection policy may be a data structure that specifies backup requirements (e.g., a backup schedule specifying points in time to generate backups, backup storage information associated with one or more backup storages to store the backup and/or portions of the backup, a retention period for keeping the backup before deletion, etc.). The protection policies may be generated by users and provided to the data protection manager, assigned to an asset by the user or the data protection manager, which may monitor the protection policies to initiate the performance of data protection services according to the backup requirements specified by the protection policy.

In another embodiment, the data protection manager may send the backup generation request in response to an on-demand backup generation request submitted by a user of the system. The user may submit the on-demand backup generation request through any type of user interface (e.g., graphical user interface) without departing from embodiments disclosed herein. The on-demand backup generation request may include backup storage information associated with one or more backup storages to store the backup and/or portions of the backup and/or other information associated with the backup generation without departing from embodiments disclosed herein.

The backup generation request associated with the asset of the host may be obtained via other and/or additional methods without departing from embodiments disclosed herein.

In Step 402, file system metadata associated with the asset is obtained. As discussed above, the storage of the host may include file system metadata repository that stores information associated with backup images, snapshots, files, folders, and/or other objects included in the file system of the host generated by a user, virtual machines (VMs), and/or applications of the host during the performance of computer implemented services and/or data protection services. The data protection agent may obtain file system metadata associated with the asset (e.g., an application for an application backup), the entirety of the file system (e.g., for a file system backup), or with a VM (e.g., for a VM backup) from the file system metadata repository. The data protection agent may use the asset identifier to obtain file system metadata associated with the asset. The data protection agent may use other appropriate methods, frameworks, or techniques to obtain file system metadata and other information regarding assets of the host (e.g., a Volume Shadow Copy Service (VSS)). The file system metadata associated with the asset may be obtained via other and/or additional methods without departing from embodiments disclosed herein.

In Step 404, data in a disk associated with the asset is identified based on the file system metadata. In one or more embodiments, the data protection agent may identify data associated with the asset using the file system metadata. The asset may include or be associated with one or more files. The data of the files may be stored in one or more storage disks of the host. In one or more embodiments, the disk may be a physical disk. In other embodiments, the disk may be a virtual disk using all and/or a portion of one or more physical disks. The data protection agent may identify file identifiers included in the file system metadata associated with the asset (e.g., all file identifiers associated with the asset identifier corresponding to the asset). The data protection agent may then identify all files corresponding to the identified file identifiers as data associated with the asset. As discussed above, the file system metadata may include file identifiers and storage locations associated with the files of the asset. The file identifiers may specify particular files and the storage locations may specify where the data of the file is stored. Each storage location may be associated with a file identifier. The storage locations may include one or more data runs and lengths associated with files of an asset. Accordingly, the data protection agent may identify data stored in a disk of the host using the file identifiers and the storage locations included in the file system metadata. The data in a disk associated with the asset may be identified based on the file system metadata via other and/or additional methods without departing from embodiments disclosed herein.

In one or more embodiments, a data run may be associated with a data of a file. The data may be stored as a span of data such as a data block. Each file may include one or more data blocks. A data run may include an offset and length. An offset may refer to one or more data structures that specify the distance from a reference point in a file system-based backup storage that includes the start of a file in the storage disk (e.g., a physical hard disk or virtual hard disk on the host). The distance may refer to the number of sectors or the quantity of data (e.g., bytes) between a reference point in the storage and the start of a file. The reference point may be a sector that includes the first file of the backup or a base sector of a disk. Since the asset may be stored according to the hierarchy of files included in the storage, the offset may be used to collect only a specifically requested file. The offset may be derived from the disk itself or from the file system metadata (e.g., the parent file identifiers and the size or lengths of each file). The offset may include other and/or additional information without departing from embodiments disclosed herein.

In one or more embodiments, lengths may refer to one or more data structures that specify where a data and/or portions of data (e.g., file data, data blocks, etc.) of a file begin and end in the storage of the host and/or the backup storage. The lengths may be obtained by the data protection agent based on the file system metadata and/or the backup image. The lengths may be pointers that reference locations in a backup storage where a data block or portion of a data block of a backup begins and ends. The lengths may be used to identify and obtain specific files or portions of files. Each length may be associated with a data block or a portion of a data of a file. Each length may be mapped to, or otherwise associated with, a file identifier of a file in the file system. The lengths may include other and/or additional information and may be used for other and/or additional purposes without departing from embodiments disclosed herein.

In Step 406, a backup of the asset is generated using the data. In one or more embodiments, the data protection agent may generate and/or initiate the generation (e.g., by other entities such as VSS services) of one or more snapshots of the data associated with the asset. The data protection agent may then write or otherwise send the data of the snapshots associated with the asset to a backup storage based on backup storage information (discussed above) included in the backup generation request. Snapshot backups may be generated by storing the backup image sub-assets associated with each snapshot in separate snapshot backup containers via other and/or additional methods without departing from embodiments disclosed herein.

In Step 408, sectors and partitions of the disk are identified. In one or more embodiments, the disk may be logically separated into sectors and partitions. The sectors may refer to the smallest divisions of the disk. The sectors may be the base units of the disk. The partitions may refer to larger logical divisions of the disk. The partition may include multiple sectors of the disk. The sectors may each comprise the same quantity of data, that is bytes of available storage space to store data. The partitions may include the same or different quantities of data. For example, the sectors may include a size of 512 bytes. The sectors and partitions may include any quantity of data space without departing from the embodiments disclosed herein.

In one or more embodiments, the data protection agent may obtain disk information. The file system metadata may include the disk information. The disk information may specify the sectors and partitions of each disk of the host. The disk information may include disk identifiers associated with each disk of the host. The disk information may further include partition identifiers associated with the partitions of the disks. The disk information may further include sector numbers associated with each sector of each disk.

In alternative embodiments, the information associated with the disk (e.g., disk identifiers, sector numbers, partition identifiers, etc.) may not be included in the file system metadata but may be obtained from other entities of the host such as the operating system, disk managers, and/or any other entity without departing from embodiments disclosed herein. The data protection agent may use the disk information to identify the sectors and partitions of the disk via other and/or additional methods without departing from the embodiments disclosed herein.

In Step 410, a start and length associated with each sector and partition are identified. As discussed above, the disk information may include disk identifiers sector numbers, and partition identifiers associated with each disk. In one or more embodiments, the disk information may also include sector sizes associated with each disk that specify the size of the sectors of each disk. The disk information may further specify the partition size and the sectors (e.g., the sector numbers) allocated to each partition of the disks. The data protection agent may use the sector numbers, sector sizes, partition sizes, and the sectors allocated to each partition to identify the start and length associated with each sector and partition. The start and length associated with each sector and partition may be identified via other and/or additional methods without departing from embodiments disclosed herein.

In Step 412, spaces between partitions are identified as slacks using the sectors. In one or more embodiments, the data protection agent may use the sectors, partition lengths, and the allocated sectors to each partition to identify spaces between partitions that are not allocated to the partitions and do not include any data associated with file stored in the file system. The data protection agent may identify the spaces between the partitions as slacks. The data protection agent may identify each space as a slack. The data protection agent may also identify and store the sectors of the disk associated with each slack.

In one or more embodiments, a slack may refer to a portion of a disk on which no data associated with the file system is stored. A slack may be vulnerable to cyberattacks as nefarious entities may hide damaging data (e.g., viruses, malware, etc.) in slacks as the data in the slacks may not be accessed, modified, or overwritten by some or all entities (e.g., data protection agent, applications, virtual machines, etc.) of the host, as the host entities may not have access to or may be unaware of the slacks as the slacks may be invisible to such entities. There may be multiple types of slacks. For example, slacks may include extended Master Boot Record (EMBR) slacks, partition slacks, disk slacks, and random-access memory (RAM) or file slacks. An EMBR Slack may include free invisible data after an MBR (e.g., the first sector of a disk that includes operation system and booting information). A partition slack may include free space after the partition invisible to file system. A disk slack may refer to free space at the beginning and/or end of a disk. A RAM or file slack may include free space left after the file size which can be overwritten when a file is expanded.

In Step 414, file size and cluster size associated with each file of the file system are obtained using the file system metadata. As discussed above, the file system metadata may specify the files (e.g., file identifiers) and the storage locations of the files stored on a disk. The storage locations may include data runs associated with each file. The data runs may specify an offset and length associated with each file. The data protection agent may use the offset and length to identify the file size as the offset may specify the starting point and the length may specify the amount of data from the offset to the ending point of the data of the file. The data protection agent may also use the disk information, specifically the sector numbers and the sector sizes to obtain the cluster size of a file. The cluster size may refer to the number of sectors or the total size of the sectors that include the data of the file. As discussed above, the sectors may include a uniform size and be associated with the lowest logical division of a disk. A single sector may include only data associated with a single file. The data protection agent may identify the sectors associated with a file using the data runs associated with the file and the disk information and calculate the total size of the sectors to obtain the cluster size of the file. The file size and cluster size associated with each file of the file system on the disk may be obtained using the file system metadata via other and/or additional methods without departing from embodiments disclosed herein.

In Step 416, a determination is made as to whether the actual size matches the cluster size for each file. As discussed above, the sectors may include a uniform size and be associated with the lowest logical division of a disk. A single sector may include only data associated with a single file. There may be scenarios in which file data may not encompass all the available space of each sector allocated to store the file data. In such scenarios, the cluster size may not match the actual size. There may be portions of one or more sectors allocated to store file data of a file that do not include file data and the actual size may not match the cluster size for such a file. In one or more embodiments, the data protection agent may compare the actual size and the cluster size of each file to determine whether the actual size and cluster size match. In one or more embodiments disclosed herein, if the actual size and the cluster size of a file do not match, then the data protection agent may determine that the actual size and cluster size of a file do not match. In one or more embodiments disclosed herein, if the actual size and the cluster size of all files on the disk match, then the data protection agent may determine that the actual size and cluster size of the files match. The determination as to whether the actual size matches the cluster for each file match may be made via other and/or additional methods without departing from embodiments disclosed herein.

In one or more embodiments disclosed herein, if it is determined that the actual file size and cluster file size for at least one file do not match, then the method proceeds to Step 418. In one or more embodiments disclosed herein, if it is determined that the actual file size and cluster file size for all files match, then the method proceeds to Step 420.

In Step 418, the deltas are identified as slacks. In one or more embodiments, the data protection agent may then identify the sectors associated with the file(s) that do not have matching actual sizes and cluster sizes. The data protection agent may then identify portions of the sector or sectors that do not include file data using the data runs associated with the file. The data protection agent may identify these portions of sectors as deltas and then identify the deltas as slacks. The deltas may be identified as slacks via other and/or additional methods without departing from embodiments disclosed herein.

In Step 420, slack metadata associated with the identified slacks is generated. In one or more embodiments, the data protection agent may generate slack metadata based on the identified slacks. The data protection agent may generate slack metadata a slack metadata file. The slack metadata file may include information associated with the identified slacks. The information may include slack identifiers, sector identifiers, slack type, and/or portions of sectors associated with each slack identified in Steps 412 and 418. As such, the slacks may be identified and located, and the data stored in the slacks may be accessed using the slack metadata file. The slack metadata associated with the identified slacks may be generated via other and/or additional methods without departing from embodiments disclosed herein.

In Step 422, the slack data and the slack metadata are provided to post processing engines for post processing. In one or more embodiments, the data protection agent may send a request to post processing engines to perform post processing on the slacks. The request may include the slack metadata and the slack data associated with the slacks. The slack data may include any data stored in the slacks. In response to obtaining the request, the post processing engines may use the slack metadata and the slack data to perform post processing on the slacks. The request may be provided to the post processing engines using any appropriate method of data transmission without departing from embodiments disclosed herein. For example, the data protection manager may transmit the request as one or more messages that include one or more network packets through one or more network devices that operatively connect the data protection agent to the post processing engines.

In one or more embodiments, the post processing engines (not shown in FIGS. 1A-1C) may refer to one or more entities that execute analytics models using the slack data and slack metadata. The analytics models may include any type of analytics models (e.g., machine learning models, artificial intelligence models, regression models, learning models, etc.) without departing from embodiments disclosed herein. The analytics models may perform cybersecurity detection and/or anomaly detection on the slacks to identify potentially damaging data included in the slacks. The analytics models may perform other and/or additional types of post processing without departing from embodiments disclosed herein. The post processing engines may be implemented as computer instructions that when executed by a processor cause the processor to perform post processing. The post processing engines may execute on the data protection manager, the host, the backup storage, and/or a third party entity not shown in FIGS. 1A-1C without departing from embodiments disclosed herein. Accordingly, slack aware data protection services may be provided on the host. The slack data and the slack metadata may be provided to post processing engines for post processing via other and/or additional methods without departing from embodiments disclosed herein.

In one or more embodiments disclosed herein, the method ends following Step 422.

Figure 5:
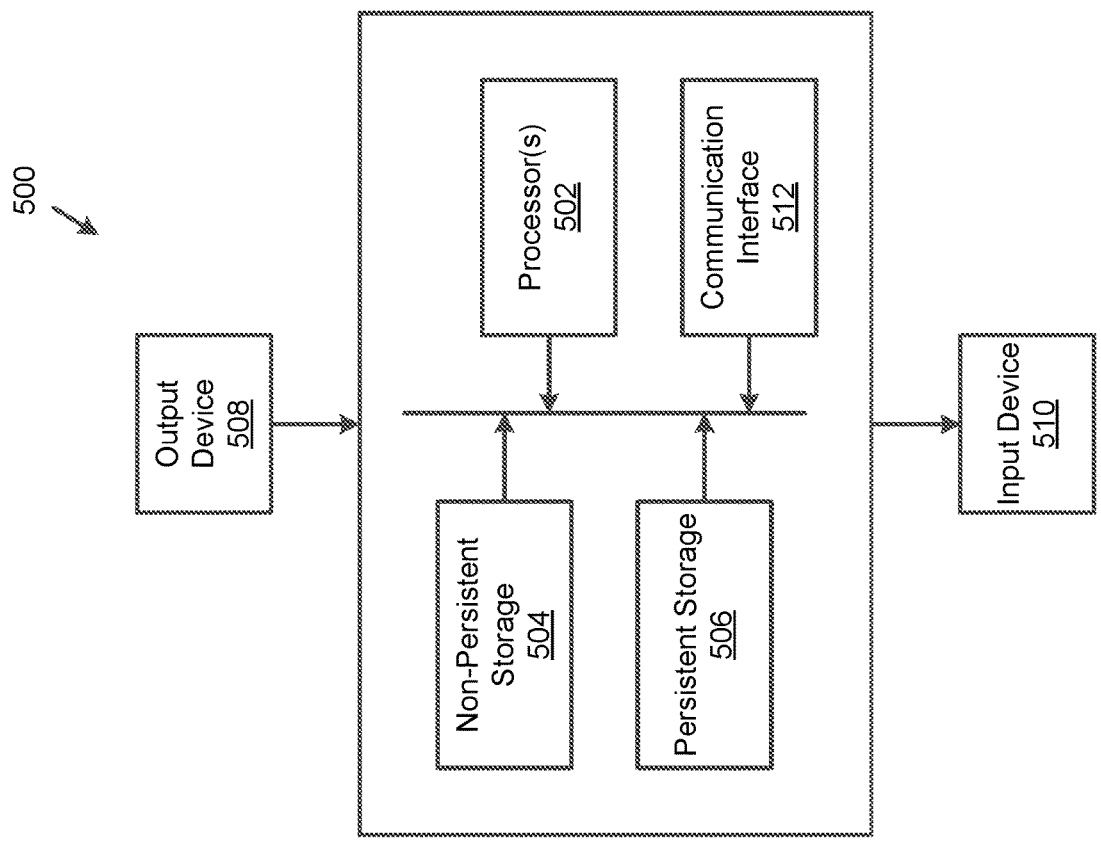
FIG. 5 shows a diagram of a computing device in accordance with one or more embodiments disclosed herein.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

As used herein, an identifier may refer to a unique combination of alphanumeric characters associated with an entity that specifies that particular entity. The identifier may be local (usable by a single component) or global (usable by all components).

As used herein, an entity that is programmed to, or configured to, perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for generating backups of host data snapshots, comprising:
   identifying, by a data protection agent of a host, an asset discovery event associated with the host;
   in response to identifying the asset discovery event:
     obtaining file system metadata associated with the host from a file system metadata repository on a storage of the host;
     identifying existing snapshots on the host using the file system metadata;
     obtaining snapshot metadata associated with the snapshots using the file system metadata;
     providing the file system metadata to a data protection manager to generate assets;
     providing the snapshot metadata to the data protection manager to generate pseudo-assets, wherein generating pseudo-assets by the data protection manager comprises:

generating pseudo-assets based on the snapshot metadata, wherein the pseudo-assets correspond to the snapshots;
assigning the pseudo-assets to protection policies; and
performing data protection services on the pseudo-assets based on the protection policies.

2. The method of claim 1, wherein assigning the pseudo-assets to protection policies comprises:
making a determination that pseudo-asset policy assignment criteria are included in a storage of the data protection manager; and
in response to the determination:
assigning the pseudo-assets to the protection policies based on the pseudo-asset policy assignment criteria.

3. The method of claim 2, wherein the pseudo-asset policy assignment criteria specifies rules for assigning pseudo-assets to protection policies.

4. The method of claim 3, wherein the pseudo-asset policy assignment criteria is configured by a user.

5. The method of claim 1, wherein assigning the pseudo-assets to protection policies comprises:
making a determination that pseudo-asset policy assignment criteria are not included in a storage of the data protection manager; and
in response to the determination:
providing the pseudo-assets to a user;
obtaining user selections associated with the pseudo-assets; and
assigning the pseudo-assets to the protection policies based on the user selections.

6. The method of claim 1, wherein an asset of the assets comprises one selected from a group consisting of:
an application;
a virtual machine; and
a file system.

7. The method of claim 1, wherein the snapshot metadata comprises:
snapshot identifiers associated with the snapshots;
creation times associated with the snapshots;
sub-asset identifiers of sub assets associated with the snapshots;
location information associated with the snapshots; and
snapshot types associated with the snapshots.

8. The method of claim 7, wherein the sub-assets comprise:
files associated with the assets; and
folders associated with the assets.

9. The method of claim 1, wherein the protection policies specify requirements for performing the data protection services.

10. The method of claim 9, wherein the data protection services comprise:
generating backups of the pseudo-assets based on the protection policies;
storing the backups in a storage location of a backup storage based on the protection policies; and
deleting the backups based on the protection policy.

11. A method for generating backups of host data snapshots, comprising:
identifying, by a data protection agent of a host, an asset discovery event associated with the host;
in response to identifying the asset discovery event:
obtaining file system metadata associated with the host from a file system metadata repository on a storage of the host;
identifying existing snapshots on the host using the file system metadata;
obtaining snapshot metadata associated with the snapshots using the file system metadata;
providing the file system metadata to a data protection manager to generate assets; and
providing the snapshot metadata to the data protection manager to generate pseudo-assets.

12. The method of claim 11, wherein generating pseudo-assets by the data protection manager comprises:
generating pseudo-assets based on the snapshot metadata, wherein the pseudo-assets correspond to the snapshots;
assigning the pseudo-assets to protection policies; and
performing data protection services on the pseudo-assets based on the protection policies.

13. The method of claim 12, wherein assigning the pseudo-assets to protection policies comprises:
making a determination that pseudo-asset policy assignment criteria are not included in a storage of the data protection manager; and
in response to the determination:
providing the pseudo-assets to a user;
obtaining user selections associated with the pseudo-assets; and
assigning the pseudo-assets to the protection policies based on the user selections.

14. The method of claim 12, wherein assigning the pseudo-assets to protection policies comprises:
making a determination that pseudo-asset policy assignment criteria are included in a storage of the data protection manager; and
in response to the determination:
assigning the pseudo-assets to the protection policies based on the pseudo-asset policy assignment criteria.

15. The method of claim 14, wherein the pseudo-asset policy assignment criteria specifies rules for assigning pseudo-assets to protection policies.

16. The method of claim 15, wherein the pseudo-asset policy assignment criteria is configured by a user.

17. The method of claim 12, wherein the protection policies specify requirements for performing the data protection services.

18. The method of claim 17, wherein the data protection services comprise:
generating backups of the pseudo-assets based on the protection policies;
storing the backups in a storage location of a backup storage based on the protection policies; and
deleting the backups based on the protection policy.

19. The method of claim 11, wherein an asset of the assets comprises one selected from a group consisting of:
an application;
a virtual machine; and
a file system.

20. The method of claim 11, wherein the snapshot metadata comprises:
snapshot identifiers associated with the snapshots;
creation times associated with the snapshots;
sub-asset identifiers of sub assets associated with the snapshots;
location information associated with the snapshots; and
snapshot types associated with the snapshots.

* * * * *